3,778,338
TOUGHENED GLASS

David Duncan Murphy, Leamington Spa, and David George Giddings, Stourbridge, England, assignors to Pilkington Brothers Limited, Liverpool, England
No Drawing. Original application Dec. 30, 1969, Ser. No. 889,340, now Patent No. 3,679,388. Divided and this application Feb. 9, 1972, Ser. No. 224,944
Int. Cl. C03b 27/00; B32b 17/10
U.S. Cl. 161—192                                   8 Claims

ABSTRACT OF THE DISCLOSURE

A toughened glass article, in particular a sheet of soda-lime-silica glass of thickness in the range 4 mm. to 12 mm. has a central tensile stress in the range 500 kg./cm.$^2$ to 1200 kg./cm.$^2$ and a stress ratio of surface compressive stress to central tensile stress in the range 2:1 to 4:1. A toughened glass sheet may be embodied in a laminated assembly for example an aircraft windscreen assembly.

CROSS REFERENCES TO RELATED APPLICATIONS

This application is divided from co-pending application Ser. No. 889,340 filed Dec. 30, 1969, now U.S. Pat. 3,679,388.

BACKGROUND OF THE INVENTION

This invention relates to the toughening of glass, for example, in the manufacture of glass panels to be embodied in supersonic aircraft.

The invention is based on the discovery that the efficacy of some oils as a chilling liquid in the toughening of glass of thickness within the preferred range, 4 mm. to 12 mm., is improved if there is present in the oil a small regulated proportion of a liquid having a boiling point lower than the flash point of the oil. For example, the low boiling point liquid may be an organic liquid such as carbon tetrachloride, methanol, benzene, toluene, trimethyl alcohol, ethyl alcohol, acetone or xylene.

SUMMARY

The invention concerns a new toughened glass article of soda-lime-silica glass, for example a glass sheet, of thickness in the range 4 mm. to 12 mm. The article has a central tensile stress in the range 500 kg./cm.$^2$ to 1200 kg./cm.$^2$ and a ratio of surface compressive stress to central tensile stress in the range 2:1 to 4:1. The article is toughened by heat exchange with an oil in which there is maintained from 0.01% to 0.07% by weight of a low boiling point liquid.

DESCRIPTION OF THE PREFERRED EMBODIMENTS

Glass sheets for example, square glass panels of soda-lime-silica glass, which are 30 cm. square, were toughened by the method of the invention. The sheets of glass were first subjected to an edge finishing operation in order to produce a bright edge finish. This was effected using first a "linisher" belt coated with carborundum followed by a finishing operation with a cork "linisher" belt impregnated with ceri-rouge. It was found that with effective edge finishing of this nature the glass temperature might be maintained in the lower region of the specified range of 650° C. to 740° C. but it was preferred, as in a number of examples set out below, to heat the glass to a temperature of about 700° C. prior to quenching.

The glass sheets were then suspended in tongs in a vertical heating furnace and when the glass had reached the desired initial temperature, e.g. of about 700° C., the suspended hot glass sheets were lowered at the rate of about 30 cm. per second through a mouth in the bottom of the furnace and into a tank of a selected chilling oil disposed near said mouth, the oil having a high initial boiling point and containing a selected proportion of a liquid having a boiling point lower than the flash point of the oil.

This selected oil/low boiling point liquid mixture was maintained, in each example, at a temperature in the range 150° C. to 240° C. The lower the temperature of the mixture, that is near the 150° C. end of the specified range, the better was the retention of the low boiling point liquid in the mixture, but at temperatures for the mixture, such as about 200° C. or higher, which were employed in many of the examples, the selected proportion of low boiling point liquid was maintained in the mixture by adding further low boiling point liquid as the mixture was circulated through a heat exchanger which maintained the circulation in the tank of oil/low boiling point liquid mixture at the required temperature of the mixture.

Commercial oils were selected for the quenching and a range of oils having a viscosity in the range 300 to 1000 centistokes at 38° C. and a flash point in the range 220° C. to 310° C. were selected for use.

In a number of the examples, the selected oil/low boiling point liquid mixture contained as selected proportion of carbon tetrachloride ($CCl_4$) as the low boiling point liquid, the selected proportion being maintained within the range of 0.01% to 0.07% by weight. However, in other examples, a selected proportion of toluene ($C_6H_5 \cdot CH_3$), benzene ($C_6H_6$), acetone (($CH_3$)$_2$CO), or xylene ($C_6H_4(CH_2)_3$) was present in the oil, instead of carbon tetrachloride. Methanol is also another suitable low boiling point liquid.

The percentage of the low boiling point liquid necessary depended on the nature of the oil, principally its viscosity, the thickness of the glass to be toughened, and the modulus of rupture, the central tensile stress and the ratio of surface compressive stress to central tensile, required in the glass. The glass undergoes a rapid chilling as it is quenched in the oil/low boiling point liquid mixture and thereafter cools gradually to the temperature of the oil/low boiling point liquid mixture, having attained the desired stress characteristics by the time it reaches that temperature. The glass was then removed from the oil/low boiling point liquid mixture and washed.

If desired, the toughened glass sheet may be laminated with one or more other glass sheets to form, for example, a glass panel to be embodied in supersonic aircraft.

The table quoted below gives a number of examples of the stresses obtained by quenching a glass sheet in a selected oil containing a specific proportion of a low boiling point liquid.

Different low boiling point liquids were employed, and the selected proportion of said liquid, the thickness of the glass, the initial temperature of the glass and the temperature of the selected oil/low boiling point liquid mixture were varied to both extremes of the particular ranges quoted above.

The selected oils comprised three different oils and the one used in each example is given in the table. The first oil was Cylrex 200M (Mobil Oil Company), a heavy naphthenic oil whose flash point is 305° C. and whose viscosity is 974 centistokes at 38° C. The next oil was Cylrex FM (Mobil Oil Company) which is a lighter oil having a flash point of 275° C. and a viscosity of 640 centistokes at 38° C. The third oil, Vacuoline AA (Mobil Oil Company) is a lighter oil still whose flash point is 225° C. and viscosity is in the range 310 to 342 centistokes at 38° C.

After each glass sheet was toughened, the modulus of rupture, the central tensile stress, and the ratio of surface compressive stress to central tensile stress, were determined in the following manner.

The toughened glass sheet under test was placed across a pair of knife edges and a steadily increasing load was applied through a similar pair of knife edges placed near the mid-point of the glass sheet. The modulus of rupture, which effectively corresponds to the breaking stress in the convex surface of the glass sheet when in tension, was then calculated from the load applied at the instant of fracture and the cross-section of the glass sheet.

Th central tensile stress in the toughened glass sheet was measured by an instrument developed by Triplex Safety Glass Company Limited which is employed to pass a beam of polarised light at a grazing angle into a principal surface of the glass sheet in such a manner that the beam emerges through the medium of the peripheral edge surface of the sheet. The beam leaving the peripheral edge is analysed by a Babinet compensator and the central tensile stress in the glass sheet is then obtained by observing the slope of the fringe formed in the beam and comparing this slope with a previous calibration.

Finally, the surface compressive stress of the glass sheet, for calculation of the ratio of the surface compressive stress to central tensile stress, is obtained by using the differential surface refractometer designed by the Pittsburgh Plate Glass Company. With this instrument, a beam of polarised light is refracted into a principal surface of the glass sheet at a critical angle which is predetermined by the relative refractive indices of the instrument components and the glass sheet, the beam travelling close to and parallel with the surface of the sheet. The compressive stress in the surface of the sheet is related to the difference in the refractive indices for light which is polarised perpendicular and parallel to the plane of incidence, and the light which emerges from the surface is analysed to give a measure of the surface compressive stress in the glass sheet.

The invention thus provides an advantageous method of toughening glass so that it has a modulus of rupture that may be as high as 5500 kg./cm.$^2$, and a ratio of surface compressive stress to central tensile stress that may be as high as 4:1, without impairing the optical characteristics of the glass. This toughened glass is particularly advantageous in application where high strength is required, and the fact that the glass will break into small fragments if fractured is of little consequence. Thus, for example, the glass is particularly effective in the manufacture of panels for supersonic aircraft, and has other applications, for example in domestic building where such high strength is required.

We claim:

1. A toughened glass article of soda-lime-silica glass whose thickness is in the range 4 mm. to 12 mm., having a central tensile stress in the range 500 kg./cm.$^2$ to 1200 kg./cm.$^2$ and a ratio of surface compressive stress to central tensile stress in the range of 2:1 to 4:1.

2. A toughened glass article according to claim 1, whose thickness is in the range 4 mm. to 8 mm., having a central tensile stress in the range 500 kg./cm.$^2$ to 900 kg./cm.$^2$.

3. A toughened glass article according to claim 2, having a central tensile stress in the range 500 kg./cm.$^2$ to 840 kg./cm.$^2$.

4. A toughened glass article according to claim 2, whose thickness is 6 mm., having a central tensile stress in the range 630 kg./cm.$^2$ to 840 kg./cm.$^2$.

5. A toughened glass article of soda-lime-silica glass as defined in claim 1 having a central tensile stress in the range 630–1200 kg./cm.$^2$ and whose thickness is in the range 6 mm. to 12 mm.

6. A sheet of toughened soda-lime-silica glass of thickness in the range of 4 mm. to 12 mm. and having a central tensile stress in the range 500 kg./cm.$^2$ to 1200 kg./cm.$^2$ and a ratio of surface compressive stress to central tensile stress in the range 2:1 to 4:1.

TABLE OF EXAMPLES

| Example number | Thickness of glass in mm. | Temperature of glass in °C. | Type of oil [1] | Proportion of low boiling point liquid in percent by weight | Temperature of oil/liquid mixture in °C. | Modulus of rupture in kg./cm.$^2$ | Central tensile kg./cm.$^2$ | Ratio of surface compressive stress to central tensile stress |
|---|---|---|---|---|---|---|---|---|
| 1 | 4 | 650 | Vacuoline AA | 0.01 CCl$_4$ | 200 | 1,500 | 500 | 2:1 |
| 2 | 4 | 700 | Cylrex FM | 0.07 CCl$_4$ | 200 | 3,500 | 840 | 3.5:1 |
| 3 | 4 | 675 | Cylrex 200M | 0.07 CCl$_4$ | 225 | 3,250 | 850 | 3:1 |
| 4 | 5 | 675 | Cylrex FM | 0.04 toluene | 180 | 2,300 | 650 | 2.6:1 |
| 5 | 5 | 718 | do | 0.02 benzene | 180 | 2,400 | 740 | 2.3:1 |
| 6 | 5 | 710 | do | do | 170 | 2,500 | 700 | 2.6:1 |
| 7 | 5 | 695 | do | do | 170 | 2,550 | 700 | 2.6:1 |
| 8 | 5 | 673 | do | do | 175 | 2,250 | 660 | 2.3:1 |
| 9 | 5 | 655 | do | do | 180 | 2,050 | 625 | 2.1:1 |
| 10 | 5 | 680 | do | 0.05 benzene | 170 | 2,300 | 680 | 2.4:1 |
| 11 | 5 | 666 | do | do | 170 | 2,200 | 650 | 2.3:1 |
| 12 | 5 | 693 | do | 0.03 acetone | 175 | 2,350 | 700 | 2.3:1 |
| 13 | 5 | 678 | do | 0.02 xylene | 170 | 2,350 | 690 | 2.4:1 |
| 14 | 6 | 700 | do | 0.04 CCl$_4$ | 200 | 3,500 | 840 | 3.5:1 |
| 15 | 6 | 700 | do | 0.03 CCl$_4$ | 200 | 3,150 | 700 | 3.5:1 |
| 16 | 6 | 700 | do | 0.02 CCl$_4$ | 200 | 2,800 | 630 | 3.5:1 |
| 17 | 6 | 700 | Cylrex 200M | 0.02 CCl$_4$ | 200 | 3,640 | 840 | 4:1 |
| 18 | 6 | 700 | do | 0.015 CCl$_4$ | 200 | 2,800 | 630 | 3.5:1 |
| 19 | 6 | 700 | Vacuoline AA | 0.05 CCl$_4$ | 200 | 3,500 | 840 | 3.5:1 |
| 20 | 6 | 670 | Cylrex FM | 0.04 toluene | 170 | 2,150 | 720 | 2:1 |
| 21 | 6 | 665 | do | 0.04 benzene | 170 | 1,950 | 690 | 2:1 |
| 22 | 6 | 655 | do | do | 170 | 1,950 | 700 | 2:1 |
| 23 | 6 | 668 | do | 0.03 acetone | 175 | 2,050 | 660 | 2.1:1 |
| 24 | 6 | 683 | do | 0.02 xylene | 170 | 2,150 | 720 | 2:1 |
| 25 | 8 | 675 | Vacuoline AA | 0.01 CCl$_4$ | 175 | 2,200 | 590 | 3:1 |
| 26 | 8 | 700 | Cylrex FM | 0.04 CCl$_4$ | 200 | 4,000 | 900 | 3.5:1 |
| 27 | 8 | 650 | Cylrex 200M | 0.02 CCl$_4$ | 210 | 4,000 | 900 | 3.5:1 |
| 28 | 10 | 680 | Vacuoline AA | 0.02 CCl$_4$ | 175 | 3,100 | 720 | 3.5:1 |
| 29 | 10 | 720 | Cylrex FM | 0.05 CCl$_4$ | 220 | 4,200 | 950 | 4:1 |
| 30 | 10 | 700 | Cylrex 200M | 0.07 CCl$_4$ | 160 | 4,500 | 1,200 | 3.5:1 |
| 31 | 10 | 691 | Cylrex FM | 0.04 toluene | 180 | 2,500 | 740 | 2.6:1 |
| 32 | 10 | 645 | do | 0.02 benzene | 170 | 1,900 | 790 | 2:1 |
| 33 | 10 | 680 | do | 0.05 benzene | 170 | 2,800 | 850 | 2.6:1 |
| 34 | 10 | 685 | do | 0.03 acetone | 170 | 2,450 | 820 | 2.3:1 |
| 35 | 10 | 685 | do | 0.02 xylene | 180 | 2,250 | 800 | 2:1 |
| 36 | 12 | 670 | Cylrex 200M | 0.07 CCl$_4$ | 240 | 5,500 | 1,100 | 4:1 |
| 37 | 12 | 660 | Cylrex FM | 0.015 CCl$_4$ | 240 | 4,000 | 950 | 3.5:1 |
| 38 | 12 | 740 | Vacuoline AA | 0.07 CCl$_4$ | 150 | 4,500 | 1,200 | 3.5:1 |

[1] Mobile Oil Company.

7. A sheet of toughened glass according to claim 6, of thickness in the range 4 mm. to 8 mm., and having a central tensile stress in the range 500 kg./cm.$^2$ to 900 kg./cm.$^2$.

8. A laminated glass assembly including at least two sheets of glass laminated together with an interlayer of transparent plastics material, wherein at least one of said sheets of glass is a toughened sheet of soda-lime-silica glass of thickness in the range 4 mm. to 12 mm. having a central tensile stress in the range 500 kg./cm.$^2$ to 1200 kg./cm.$^2$ and a ratio of surface compressive stress to central tensile stress in the range 2:1 to 4:1.

References Cited

UNITED STATES PATENTS

| | | | |
|---|---|---|---|
| 2,285,596 | 6/1942 | Littleton et al. | 65—116 |
| 3,186,816 | 6/1965 | Wartenberg | 65—116 |
| 3,445,316 | 5/1969 | Megles | 161—166 |
| 3,595,725 | 7/1971 | Coen | 65—114 X |
| 3,653,866 | 4/1972 | Wartenberg | 65—116 |
| 2,145,119 | 1/1939 | Littleton | 65—116 |
| 3,271,207 | 9/1966 | Davis | 65—116 X |

CHARLES E. VAN HORN, Primary Examiner

U.S. Cl. X.R.

161—1, 165, 166

UNITED STATES PATENT OFFICE
CERTIFICATE OF CORRECTION

Patent No. 3,778,338  Dated December 11, 1973

Inventor(s) David Duncan Murphy and David George Giddings

It is certified that error appears in the above-identified patent and that said Letters Patent are hereby corrected as shown below:

---[30]  Foreign Application Priority Data
    Great Britain    1262/69, filed January 8, 1969

Great Britain    31952/69, filed June 24, 1969.---

Signed and sealed this 11th day of June 1974.

(SEAL)
Attest:

EDWARD M. FLETCHER, JR.　　　　　　C. MARSHALL DANN
Attesting Officer　　　　　　　　　　Commissioner of Patents